United States Patent
Yang et al.

(10) Patent No.: US 9,347,153 B2
(45) Date of Patent: May 24, 2016

(54) WEAR-RESISTANT CLAMPING PLATE DEVICE FOR STUFFER BOX CRIMPER

(75) Inventors: Baoru Yang, Jiangsu (CN); Jianhua Cao, Jiangsu (CN)

(73) Assignee: NANTONG CELLULOSE FIBERS CO., LTD., Nantong, Jiangsu (CN)

( * ) Notice: Subject to any disclaimer, the term of this patent is extended or adjusted under 35 U.S.C. 154(b) by 327 days.

(21) Appl. No.: 14/126,180

(22) PCT Filed: Jun. 15, 2012

(86) PCT No.: PCT/CN2012/077010
§ 371 (c)(1),
(2), (4) Date: Dec. 13, 2013

(87) PCT Pub. No.: WO2012/171483
PCT Pub. Date: Dec. 20, 2012

(65) Prior Publication Data
US 2014/0109363 A1    Apr. 24, 2014

(30) Foreign Application Priority Data

Jun. 16, 2011    (CN) .......................... 2011 1 0162731

(51) Int. Cl.
*D02G 1/12* (2006.01)
*F16B 2/14* (2006.01)

(52) U.S. Cl.
CPC .... *D02G 1/12* (2013.01); *F16B 2/14* (2013.01)

(58) Field of Classification Search
CPC ........... D02G 1/12; D02G 1/125; D02G 1/14; D02G 1/122; D02G 1/127; D02J 1/04; D02J 1/02; D02J 1/20; F16B 2/14

USPC .............. 28/263, 268, 269, 270, 264; 26/18.6
See application file for complete search history.

(56) References Cited

U.S. PATENT DOCUMENTS 3,160,941 A * 12/1964 Williamson ............. D02G 1/12
                                                    19/66 R
3,373,469 A *  3/1968 Boggs ...................... D02G 1/12
                                                       28/269

(Continued)

FOREIGN PATENT DOCUMENTS

| CN | 2663459 Y | 12/2004 |
| CN | 101367171 A | 2/2009 |
| GB | 1 273 761 | 2/1972 |

OTHER PUBLICATIONS

International Search Report mailed Sep. 20, 2012; PCT/CN2012/077010.

*Primary Examiner* — Amy Vanatta
(74) *Attorney, Agent, or Firm* — Ladas & Parry LLP

(57) ABSTRACT

A cheek plate device for a stuffer box crimper, comprising a bracket, adjusting mechanisms, cheek plates, a base, a pair of nip rollers and thrust devices. The adjusting mechanisms, which can slide relative to the bracket, are arranged on the bracket, the cheek plates are installed on the inner sides of the adjusting mechanisms, a pair of identical brackets, adjusting mechanisms and cheek plates are symmetrically installed on each side of the pair of nip rollers and affixed on the base. The adjusting mechanisms have adjusting blocks and elastic devices, the elastic devices are installed at the ends of the adjusting blocks and push against the thrust devices, the thrust devices push the adjusting blocks via the elastic devices, and the adjusting blocks push the two cheek plates moving towards the sides of the pair of nip rollers.

20 Claims, 2 Drawing Sheets

(56) References Cited

U.S. PATENT DOCUMENTS

| | | | | |
|---|---|---|---|---|
| 3,618,183 A * | 11/1971 | Funk | D02G 1/12 | 28/269 |
| 3,800,373 A * | 4/1974 | Fleissner | D02G 1/12 | 28/248 |
| 3,924,911 A * | 12/1975 | Bumberger | D02G 1/12 | 100/176 |
| 4,019,788 A * | 4/1977 | Buchalla | F16J 15/168 | 384/483 |
| 4,067,092 A * | 1/1978 | Roberts | D02G 1/125 | 28/251 |
| 4,662,042 A * | 5/1987 | Bayliss, Sr. | D02G 1/12 | 28/269 |
| 4,807,337 A * | 2/1989 | Fleissner | D02G 1/125 | 28/248 |
| 5,778,502 A * | 7/1998 | Voigtlander | D02G 1/12 | 28/263 |
| 7,278,191 B1 * | 10/2007 | Lane | D02G 1/12 | 28/263 |

* cited by examiner

WEAR-RESISTANT CLAMPING PLATE DEVICE FOR STUFFER BOX CRIMPER

TECHNICAL FIELD

The present invention generally relates to the field of crimping devices, and more specifically relates to a cheek plate device for a stuffer box crimper.

BACKGROUND

One known cheek plate adjusting device for a stuffer box crimper is fixed by screw 17 on base frame 14. It is widely practiced that two cheek plates 13 are installed on two sides of a pair of nip rollers 15 and a preset clamping force is maintained between cheek plates 13 and the sides of the pair of nip rollers 15. The clamping force is adjusted to such a preset value that it prevents materials from being squeezed out of the edges of the pair of nip rollers while minimizing the friction force between the cheek plates 13 and the pair of nip rollers 15. The clamping force value is adjusted by turning or adjusting screws 16 in or out to move wedge blocks 12 relative to brackets 11, which pushes the cheek plate 13 against the sides of the pair of nip rollers 15. However, it is difficult to adjust the clamping force precisely to the preset value. During operation of the crimper, grinding friction between the surfaces of the static cheek plates and the sides of the fast rotating nip rollers will lead to mechanical wear of the surfaces of the cheek plate, or the sides of the nip rollers, or both, which, after a long period operation, can produce gaps between the cheek plates 13 and the sides of the nip rollers 15. The materials may be squeezed into the gaps, causing damage to the materials and thus affecting product quality. This mechanical wear is a continuous process and the gap becomes bigger gradually, which makes it necessary to make periodic manual adjustment because the current device lacks automatic adjustment mechanism. One patent, No. ZL200320110083.7, related to the present field of invention, disclosed a design that changed the shape of the surface of the wedge that is in contact with the bracket from flat to cylindrical, which solved the problem of parallel adjustment between the cheek plates and the side surfaces of the pair of nip rollers and enables more complete contact between the cheek plates and the side surfaces of the pair of nip rollers.

SUMMARY OF THE INVENTION

An objective of the present invention is to provide a cheek plate device for a stuffer box crimper. The device can automatically and instantly compensate for any mechanical wear of the cheek plates or the side surfaces of a pair of nip rollers, which may occur during operation of the crimper, furthermore, parts of the device are easily made, installed, and adjusted.

To achieve the objective above, the present invention provides a technical solution as below:

An adjusting block is made having one end as a wedge and the other end as a cylinder, a bracket has a hole that matches the cylinder, and a compression spring is placed inside the hole of the bracket. Preferably, two compression springs with the same compression characteristics are symmetrically used on the same crimper, and adjusting screws capable of adjusting the compressions of the compression springs are installed on the bracket, and a lock nut is mounted on each adjusting screw. When the cheek plate device is to be adjusted, the lock nut is loosened, the compression of the compression spring is adjusted by turning in or out the adjusting screw, the compression spring forces the wedge of the adjusting block to push the cheek plates to achieve close contact with the side surfaces of the pair of nip rollers. When mechanical wear of the cheek plates or the side surfaces of the pair of nip rollers occurs, the compression spring can instantly provide automatic compensation and constantly maintain a proper clamping state. The clamping force between the cheek plates and the side surfaces of the pair of nip rollers can be adjusted by turning in or out the adjusting screw.

A cheek plate device for a stuffer box crimper comprises brackets, adjusting mechanisms, cheek plates, a base, a pair of nip rollers and thrust devices. The adjusting mechanisms which can slide relative to the brackets are mounted on the brackets, the cheek plates are mounted on the inner sides of the adjusting mechanisms, a pair of identical brackets, adjusting mechanisms and cheek plates are symmetrically mounted on the two sides of the pair of nip rollers and arranged on the base. Each of the adjusting mechanisms comprises an adjusting block and an elastic device, and the elastic device is arranged on one end of the adjusting block and abuts against the thrust device.

The adjusting block has a step portion, of which, one end is a cylinder which extends into a corresponding hole in the bracket and the other end is a wedge with one side being in contact with the cheek plate, and a stop portion which is affixed on the bracket corresponding to the position of the step portion of the adjusting block.

The cylindrical piston and the wedge of the adjusting block can be fabricated as one piece or as separate pieces that are assembled together.

The surface of the wedge consists of a plural of surfaces, which can be curved, flat or a combination thereof, preferably, a plural of flat surfaces, and, more preferably, a combination of flat and curved surfaces.

The cross section of the cylindrical piston of the adjusting block has a regular geometrical shape, preferably a circle.

The elastic device, which is installed in a matching hole in the bracket, comprises a compression spring and a sliding plate. One end of the compression spring abuts against the cylinder of the adjusting block while the other end abuts against one side of the sliding plate, and the other side of the sliding plate abuts against the thrust device.

The dimension and spring constant (k) of the compression spring are determined based upon a pressure (F) that needs to be applied to the adjusting block: $F=k(FL-DL)$, wherein DL represents the compression length of the compression spring after adjustment, and FL represents the free length of the compression spring. Preferably, (k) and (FL) values are selected to result in $20\% \leq DL/FL \leq 90\%$, and more preferably, (k) and (FL) values are selected to result in $30\% \leq DL/FL \leq 80\%$.

The thrust device comprises an adjusting screw and a lock nut, and one end of the adjusting screw abuts against the elastic device while the other end is locked by the lock nut.

The thrust device is directly adjusted by the adjusting screw or by differential threads adjustment.

The differential threads adjustment includes a step-like adjusting screw, of which, one end couples with the bracket and has a larger thread and the other end has a smaller thread. The larger thread has larger diameter and pitch than the smaller thread.

The differential threads adjustment includes a female thread in the middle of the sliding plate and the female thread matches the smaller thread on the step-like adjusting screw.

The differential threads adjustment includes a device for preventing the sliding plate from rotation, which ensures that the sliding plate can only slide inside the hole of the bracket, but cannot rotate.

By applying the technical solutions above, the present invention has the characteristics below: when the cheek plate device is to be adjusted, the lock nut is loosened, the compression of the compression spring is adjusted by turning in or out the adjusting screw, the compression spring forces the wedge of the adjusting block to push the cheek plate to achieve close contact with the side surfaces of the pair of nip rollers, and when mechanical wear occurs on the cheek plates or the side surfaces of the pair of nip rollers, the compression spring can instantly provide automatic compensation and maintain a proper clamping state. The clamping force between the cheek plates and the side surfaces of the pair of nip rollers can be adjusted by turning in or out the adjusting screw.

DETAILED DESCRIPTION OF SPECIAL EMBODIMENTS

Figure 1:
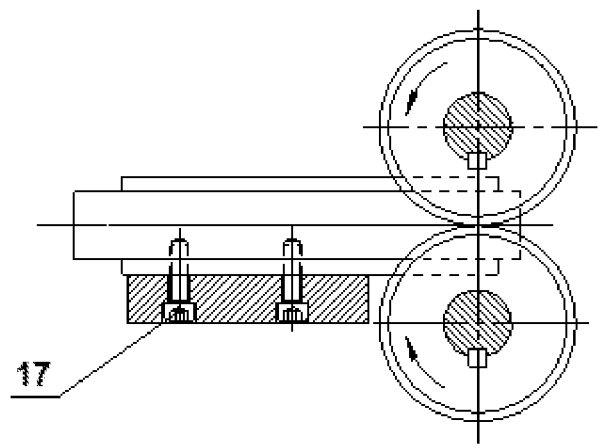
FIG. 1 is a front view of the structure of the prior art cheek plate device.
Figure 2:
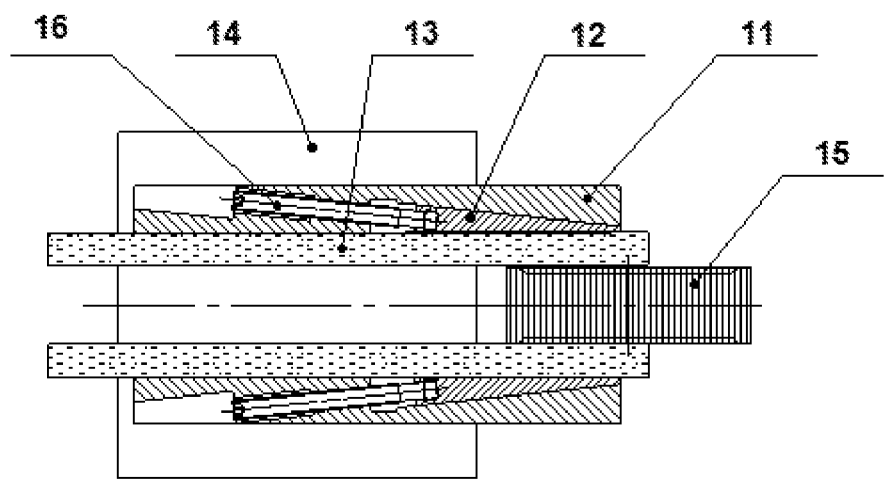
FIG. 2 is a top sectional view of the structure of the prior art cheek plate device.
Figure 3:
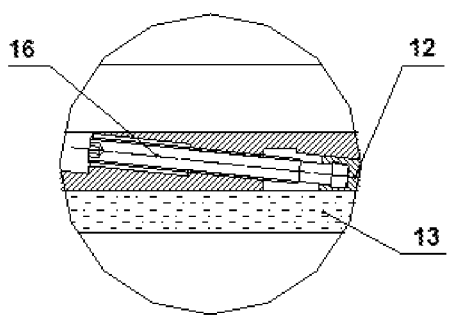
FIG. 3 is a partially enlarged view of the thread adjustment part of the prior art cheek plate device.

Further description is made below to the present invention with reference to the embodiments as shown in the drawings.

Figure 4:
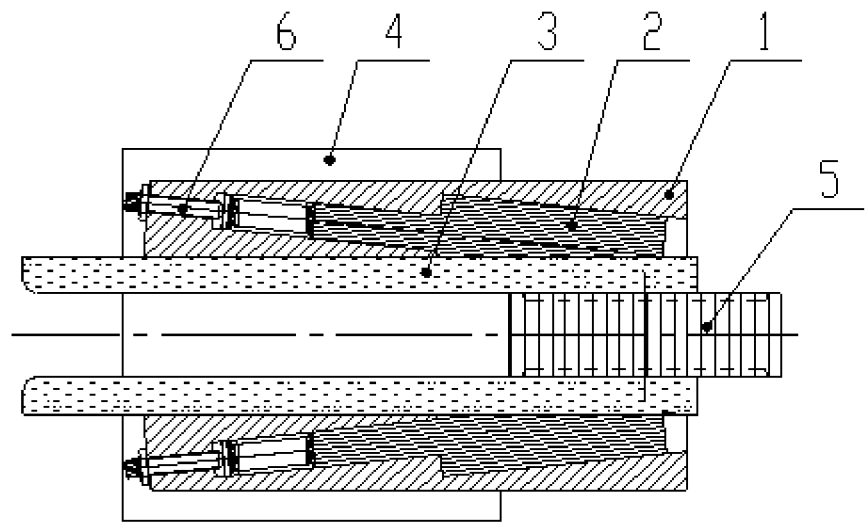
FIG. 4 is a top sectional view of the embodiment of the present invention.
Figure 5:
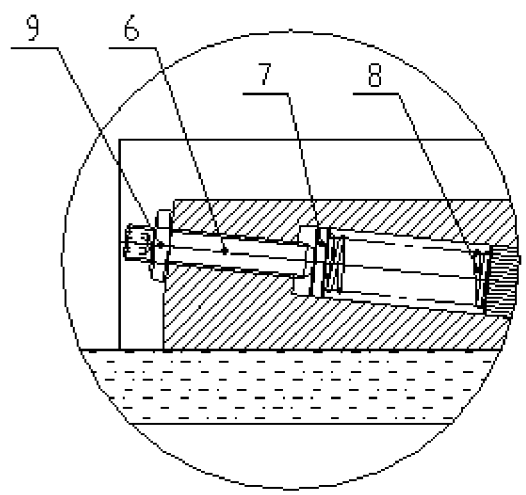
FIG. 5 is a partially enlarged view of the mounting location of the compression spring of the present invention.

As shown in FIG. 4 and FIG. 5, a cheek plate device for a stuffier box crimper comprises brackets 1, adjusting blocks 2 that are mounted on the brackets 1 and can slide relative to the brackets 1, compression springs 8, sliding plates 7 that can slide inside the holes in the brackets 1, adjusting screws 6, and lock nuts 9. Cheek plates 3 are mounted at the inner sides of the adjusting blocks 2. A pair of identical brackets 1, adjusting blocks 2, cheek plates 3, compression springs 8, sliding plates 7, adjusting screws 6, and lock nuts 9 are symmetrically mounted on the two sides of a pair of nip rollers 5. Each of the adjusting blocks 2 is provided with a step portion, of which, one end is a cylinder and the other end is a wedge. The cylinder is a cylindrical piston. The cylindrical piston and the wedge are fabricated as one piece or as separate pieces that are assembled together. The surface of the wedge consists of a plural of surfaces, which can be curved, flat or a combination thereof. Preferably, the surface of the wedge consists of a combination of flat and curved surfaces. In this embodiment, as shown in the drawings, one side of the wedge is a flat surface and is in contact with the cheek plate 3 while the other side is a cylindrical surface and is in contact with the bracket 1, which has a stop portion corresponding to the step portion of the adjusting block 2. The adjusting blocks 2 can slide relative to the brackets 1. The adjusting blocks 2 stop sliding when the step portions slide toward and touch the stop portions, and the wedges of the adjusting blocks 2 force the two cheek plates 3 to move towards the side surfaces of the pair of nip rollers 5 when the step portions move away from the stop portions. The bracket 1 has a hole that matches the cylinder of the adjusting block 2. The compression spring 8, which is mounted inside the hole, abuts against the adjusting block 2 on one end and against one side of the sliding plate 7 on the other end. The other side of the sliding plate 7 abuts against the adjusting screw 6. During operation, the adjusting screws 6 is turned in or out to adjust the compression force of the compression springs 8, which compression force forces the adjusting block 2 to slide relative to the bracket 1. The wedges of the adjusting blocks 2 push the cheek plates 3 to achieve close contact with the side surfaces of the pair of nip rollers 5 and maintain the set clamping force, which not only prevents materials from being extruded out of the edges of the pair of nip rollers 5, but also reduce the friction force between the cheek plates 3 and the side surfaces of the pair of nip rollers 5 as much as possible. The compression force of the compression spring 8 also provides instant compensation in case of mechanical wear of the cheek plate 3 or the side surfaces of the pair of nip rollers 5. In order to prevent the adjusting screws 6 from loosening, the lock nuts 9 may also be mounted on the adjusting screws 6. When the cheek plate device is to be adjusted, the lock nuts 9 are loosened at first and then the compressions of the compression springs 8 are adjusted by turning in or out the adjusting screws 6. The entire cheek plate device is fixed on a mounting base 4 by screws.

The aforementioned adjusting screw 6 may also be designed as a step-like adjusting screw, of which, one end couples with the bracket 1 and has a larger thread and the other end has a smaller thread. The larger thread has larger diameter and pitch than the smaller thread. A female thread is in the middle of the sliding plate 7 and matches the smaller thread on the adjusting screw 6. A device for preventing the sliding plate 7 from rotation is installed so as to ensure that the sliding plate 7 can only slide, but not rotate, inside the hole of the bracket 1. Thus, when the adjusting screw 6 is turned one full rotation, the sliding plate 7 will slide, inside the hole of the bracket 1, a distance equal to the difference between the larger and smaller pitches of the threads on the step-like adjusting screw 6, so as to realize differential threads adjustment with higher precision. Wherein, the dimension and spring constant (k) of the compression spring are determined based upon a pressure (F) that needs to be applied to the adjusting block: $F=k(FL-DL)$, wherein DL represents the compression length of the compression spring after adjustment, and FL represents the free length of the compression spring. Preferably, (k) and (FL) values are selected to result in $20\% \leq DL/FL \leq 90\%$, and more preferably, (k) and (FL) values are selected to result in $30\% \leq DL/FL \leq 80\%$.

The aforementioned description to the embodiments is given for the purpose of understanding and application of the present invention by those with ordinary skill in this art. Apparently, various modifications could be readily made to these embodiments by those skilled in the art, and the general principle described herein can be applied in other embodiments without any creative effort. Thus, the present invention is not limited to the embodiments described herein, and improvements and modifications made to the present invention by those skilled in this art in accordance with the disclosure of the present invention shall fall within the scope of the present invention.

We claim:

1. A cheek plate device for a stuffer box crimper, which comprises brackets, adjusting mechanisms, cheek plates, a base, a pair of nip rollers and thrust devices, the adjusting mechanisms which can slide relative to the bracket being mounted on the brackets, the cheek plates being mounted on inner sides of the adjusting mechanisms, a pair of identical brackets, adjusting mechanisms and cheek plates being symmetrically mounted at two sides of the pair of nip rollers and arranged on the base, and wherein the thrust device is adjusted by differential threads adjustment, each of the adjusting mechanisms comprises an adjusting block and an elastic device, and the elastic device is arranged on one end of the adjusting block and abuts against the thrust device;

the thrust device comprises an adjusting screw and a lock nut, and one end of the adjusting screw abuts against the elastic device while the other end is locked by the lock nut;

the differential threads adjustment includes a step-shaped adjusting screw, of which, one end that couples with the bracket has a thread larger than that of the other end;

the elastic device, which is installed in a matching hole in the bracket, comprises a compression spring and a sliding plate, wherein one end of the compressions spring abuts against cylinder of the adjusting block while the other end abuts against one side of the sliding plate, and the other side of the sliding plate abuts against the thrust device;

the thrust device has a device for preventing the sliding plate from rotation, and in the middle of the sliding plate, there is a female thread that matches the smaller thread on the step-shaped adjusting screw.

2. The cheek plate device for a stuffer box crimper according to claim 1, wherein the adjusting block has a step portion, of which, one end is a cylinder which extends into a corresponding hole in the bracket and the other end is a wedge with one side coming in contact with the cheek plate, and a stop portion which is affixed on the bracket corresponding to the position of the step portion of the adjusting block.

3. The cheek plate device for a stuffer box crimper according to claim 2, wherein the adjusting block, which consists of a cylindrical piston and a wedge, can be fabricated as one piece or as separate pieces that are assembled together, and the surface of the wedge, which consists of a plurality of surfaces, can be curved, flat or a combination thereof.

4. The cheek plate device for a stuffer box crimper according to claim 3, wherein the cylinder cross section of the adjusting block has a regular geometrical shape.

5. The cheek plate device for a stuffer box crimper according to claim 1, wherein the dimension and spring constant k of the compression spring are determined based upon a pressure F that needs to be applied to the adjusting block: F=k(FL-DL), wherein DL represents the compression length of the compression spring after adjustment, and FL represents the free length of the compression spring.

6. A cheek plate device for a stuffer box crimper, the cheek plate device comprising:
 a bracket;
 an adjustment block connected to the bracket;
 a compression spring connected within the bracket in which one end of the compression spring is connected to the adjustment block;
 a slide plate connected within the bracket in which another end of the compression spring is connected to the slide plate;
 an adjusting screw mounted to the bracket in which one end of the adjusting screw is connected to the sliding plate;
 a cheek plate mounted on the bracket and connected to the adjustment block; and
 a nip roller adjacent to the cheek plate.

7. The cheek plate device of claim 6, further comprising a lock nut connected to the adjusting screw.

8. The cheek plate device of claim 6, further comprising a mounting base connected to the bracket.

9. The cheek plate device of claim 6, wherein the adjustment block comprises a wedge shaped end and a cylindrical piston shaped end.

10. The cheek plate device of claim 9, wherein the cylindrical piston shaped end is mounted within a cylindrical hole of the bracket.

11. The cheek plate device of claim 9, wherein the wedge shaped end of the adjustment block is connected to the cheek plate.

12. The cheek plate device of claim 9, wherein the adjusting screw is configured to push against the sliding plate when the adjusting screw is turned.

13. The cheek plate device of claim 12, wherein the sliding plate is configured to push against the compression spring when the sliding plate is pushed by the adjusting screw.

14. The cheek plate device of claim 13, wherein the compression spring is configured to push against the cylindrical shaped end of the adjustment block when the compression spring is pushed by the sliding plate.

15. The cheek plate device of claim 14, wherein the wedge shaped end of the adjustment block is configured to push against the cheek plate when the compression spring pushes against the cylindrical shaped end of the adjustment block.

16. The cheek plate device of claim 15, wherein the cheek plate is configured to push against the nip roller when the wedge shaped end of the adjustment block pushes against the cheek plate.

17. The cheek plate device of claim 6, further comprising:
 a pair of brackets;
 a pair of adjustment blocks;
 a pair of compression springs;
 a pair of slide plates;
 a pair of adjusting screws;
 a pair of cheek plates; and
 a pair of nip rollers.

18. A cheek plate device for a stuffer box crimper, the cheek plate device comprising:
 a mounting base;
 a bracket connected to the mounting base;
 an adjustment block connected to the bracket;
 a compression spring connected within the bracket in which one end of the compression spring is connected to the adjustment block;
 a slide plate connected within the bracket in which another end of the compression spring is connected to the slide plate;
 an adjusting screw mounted to the bracket in which one end of the adjusting screw is connected to the sliding plate;
 a lock nut connected to the adjusting screw;
 a cheek plate mounted on the bracket and connected to the adjustment block; and
 a nip roller adjacent to the cheek plate.

19. The cheek plate device of claim 18, further comprising:
 a pair of brackets;
 a pair of adjustment blocks;
 a pair of compression springs;
 a pair of slide plates;
 a pair of adjusting screws;
 a pair of cheek plates; and
 a pair of nip rollers.

20. The cheek plate device of claim 18, wherein
 the adjustment block comprises a wedge shaped end and a cylindrical piston shaped end;
 the cylindrical piston shaped end is mounted within a cylindrical hole of the bracket;
 the wedge shaped end of the adjustment block is connected to the cheek plate;

the adjusting screw is configured to push against the sliding plate when the adjusting screw is turned;

the sliding plate is configured to push against the compression spring when the sliding plate is pushed by the adjusting screw;

the compression spring is configured to push against the cylindrical shaped end of the adjustment block when the compression spring is pushed by the sliding plate;

the wedge shaped end of the adjustment block is configured to push against the cheek plate when the compression spring pushes against the cylindrical shaped end of the adjustment block; and wherein the cheek plate is configured to push against the nip roller when the wedge shaped end of the adjustment block pushes against the cheek plate.

* * * * *